US007001559B2

(12) United States Patent
Oobayashi et al.

(10) Patent No.: US 7,001,559 B2
(45) Date of Patent: Feb. 21, 2006

(54) PRODUCTION OF PNEUMATIC TIRES

(75) Inventors: Akio Oobayashi, Kodaira (JP); Haruo Toyoda, Kodaira (JP); Hitoshi Nara, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 252 days.

(21) Appl. No.: 10/006,384

(22) Filed: Dec. 10, 2001

(65) Prior Publication Data

US 2002/0079041 A1    Jun. 27, 2002

(30) Foreign Application Priority Data

Dec. 12, 2000   (JP)   .............................. 2000-376912

(51) Int. Cl.
B29C 31/08    (2006.01)
B29C 35/04    (2006.01)

(52) U.S. Cl. ...................... 264/237; 264/315; 264/326; 425/31; 425/33; 425/38; 425/58; 425/58.1

(58) Field of Classification Search ............. 156/130.5, 156/416; 264/326, 237, DIG. 65, 315; 425/38, 425/40, 48, 50–58.1, DIG. 39, 31, 33
See application file for complete search history.

(56) References Cited

U.S. PATENT DOCUMENTS

| | | | | |
|---|---|---|---|---|
| 1,612,565 A | * | 12/1926 | Brown | ........................ 264/315 |
| 2,824,336 A | * | 2/1958 | Weigold et al. | ............... 425/31 |
| 2,963,737 A | * | 12/1960 | Soderquist | ................. 425/58.1 |
| 2,978,749 A | | 4/1961 | Del Mar | |
| 3,621,520 A | * | 11/1971 | Ulm | ........................... 425/58.1 |
| 3,759,394 A | | 9/1973 | Hottle | |
| 3,864,189 A | * | 2/1975 | Galleithner et al. | ......... 156/415 |
| 3,909,337 A | * | 9/1975 | Yabe | ........................... 156/416 |
| 3,922,122 A | * | 11/1975 | Bottasso et al. | .............. 425/46 |
| 4,861,253 A | * | 8/1989 | Mattson | ....................... 425/143 |
| 5,853,526 A | | 12/1998 | Laurent et al. | |
| 6,620,367 B1 | * | 9/2003 | Mitamura | .................... 264/294 |

FOREIGN PATENT DOCUMENTS

| | | |
|---|---|---|
| DE | 1-208-878 | 1/1966 |
| EP | 0-468-343 A1 | 1/1992 |
| EP | 0-578-104 A2 | 1/1994 |
| EP | 0-578-106 A2 | 1/1994 |
| EP | 0-685-320 A2 | 6/1995 |
| EP | 1-090-729 A2 | 4/2001 |
| JP | 2-22016 A * | 1/1990 |

* cited by examiner

Primary Examiner—Geoffrey L. Knable
(74) Attorney, Agent, or Firm—Oliff & Berridge, PLC

(57) ABSTRACT

A method of highly efficiently producing pneumatic tires, wherein both bead portions (B) of a green tire (G) are supported by a pair of holders (24, 50) and opposite axial ends of a bladder (25) are tightly attached to the holders (24, 50), respectively. The holders (24, 50) are joined to each other and a fluid is supplied into the bladder (25), to preliminarily inflate the bladder (25) within the green tire (G). The green tire (G) is transferred into a vulcanizer, together with the holders (24, 50) and the preliminarily inflated bladder (25). A heat medium is supplied into the bladder (25), to vulcanize the green tire (G) and form a vulcanized tire (K). The preliminary inflation of the bladder (25) at a location outside of the vulcanizer eliminates or shortens the waiting time within the vulcanizer, thereby improving the overall work efficiency and productivity at a tire factory.

6 Claims, 5 Drawing Sheets

PRODUCTION OF PNEUMATIC TIRES

BACKGROUND OF THE INVENTION

1. Field of the Invention

The present invention relates to a method of, and an apparatus for highly efficiently producing pneumatic tires.

2. Description of Related Art

As known in the art, in order to produce pneumatic tires, a green tires with a substantially toroidal cross section is formed on a building drum, and then transferred into a vulcanizing mold while it is maintained open. The vulcanizing mold is then closed and a heat medium at high temperature and high pressure is supplied into a bladder of the vulcanizer, thereby inflating the bladder within the green tire and vulcanizing the green tire in the mold to form a product tire.

The above-mentioned conventional vulcanizing process suffers from a problem that a substantial waiting time is required before vulcanization of the green tire is actually started. It would be highly desirable to eliminate or shorten the waiting time for the vulcanizing process as far as possible, thereby improving the overall work efficiency and productivity at a tire factory.

SUMMARY OF THE INVENTION

It is therefore an object of the present invention to provide a method and apparatus for producing a pneumatic tire, capable of effectively eliminating or shortening the waiting time for the vulcanizing process and improving the overall work efficiency and productivity at a tire factory.

The inventors conducted thorough research and investigations seeking for a solution of the above-mentioned problem, and arrive at a unique concept of eliminating or shortening the waiting time for the vulcanizing process by a preliminary inflation of the bladder as an outside operation, i.e., at a location outside of the vulcanizer and at a time point before the green tire is placed in the vulcanizing mold.

According to one aspect of the present invention, there is provided a method for producing a pneumatic tire, which comprises the steps of:

supporting both bead portions of a green tire by a pair of holders to which opposite axial ends of a bladder are tightly attached, respectively, joining holders to each other and supplying a fluid into the bladder to preliminarily inflate the bladder within the green tire, and transferring the green tire into a vulcanizer, together with the holders and the preliminarily inflated bladder, and then supplying a heat medium into the bladder, to thereby vulcanize the green tire and form a vulcanized tire.

According to another aspect of the present invention, there is provided an apparatus for producing a pneumatic tire, which comprises:

a preprocessing machine comprised of (i) joining means for mutually joining a pair of holders supporting both bead portions of a green tire, respectively, and (ii) preliminary inflating means for supplying a fluid into a bladder having opposite axial ends tightly attached to the holders, respectively, to thereby preliminarily inflate the bladder within the green tire;

a vulcanizer for supplying a heat medium into the bladder within the green tire, to thereby vulcanize the green tire and form a vulcanized tire; and transfer means for transferring the green tire together with said holders and the preliminarily inflated bladder, from the preprocessing machine to the vulcanizer.

With the method and apparatus according to the present invention, the holders supporting both bead portions of a green tire, respectively, are joined to each other by the joining means, and a fluid is supplied into the bladder to thereby preliminarily inflate the bladder within the green tire. Thereafter, the green tire, together with the holders and the preliminarily inflated bladder, is transferred from the preprocessing machine to the vulcanizer, and a heat medium is supplied into the bladder, to thereby vulcanize the green tire into a vulcanized tire.

In this way, at a location outside of the vulcanizer and at a time point before the vulcanizing operation, the green tire is combined with the holders and bladder, and the bladder is preliminarily inflated by supplying the fluid into the bladder. The assembly comprised of the green tire, holders and preliminarily inflated bladder can be delivered into the vulcanizer as it is, thereby allowing vulcanization of the green tire to be immediately started, and improving the overall work efficiency and productivity at a tire factory.

It is preferred that the fluid to be supplied for preliminarily inflating the bladder is a fluid. In this instance, the holders, the bladder and the green tire can be effectively heated in advance of the vulcanizing operation, thereby allowing further shortening of the waiting time for vulcanization.

Advantageously, the method according to the present invention further comprises the steps of:

transferring the vulcanized tire, together with the holders and the bladder, from the vulcanizer to a post-cure inflator, and attaching said holders to a rotary shaft of said post-cure inflator; and rotating the rotary shaft of the post-cure inflator to thereby cool the vulcanized tire. In this instance, because it is unnecessary to discharge the heat medium from the bladder after vulcanization, it is possible to further improve the work efficiency. It is also unnecessary to separate the vulcanized tire from the bladder before the post-curing and to mount the vulcanized tire onto a rim of the post-cure inflator, and it is thus possible to achieve substantial improvement in terms of uniformity of product tires. Moreover, since the rim of the post-cure inflator is substituted by the holders, it is possible to achieve substantial simplification in terms of structure of the post-cure inflator.

It is preferred that, upon post-curing of the vulcanized tire, a low-temperature fluid is supplied into the bladder, to accelerate cooling of the vulcanized tire. The vulcanized tire is thereby rapidly cooled while avoiding a direct contact between the inner surface of the vulcanized tire and the fluid.

BRIEF DESCRIPTION OF THE DRAWINGS

The present invention will be described in further detail hereinafter, with reference to a preferred embodiment shown in the accompanying drawings, wherein.

DETAILED DESCRIPTION OF PREFERRED EMBODIMENTS

Figure 1:
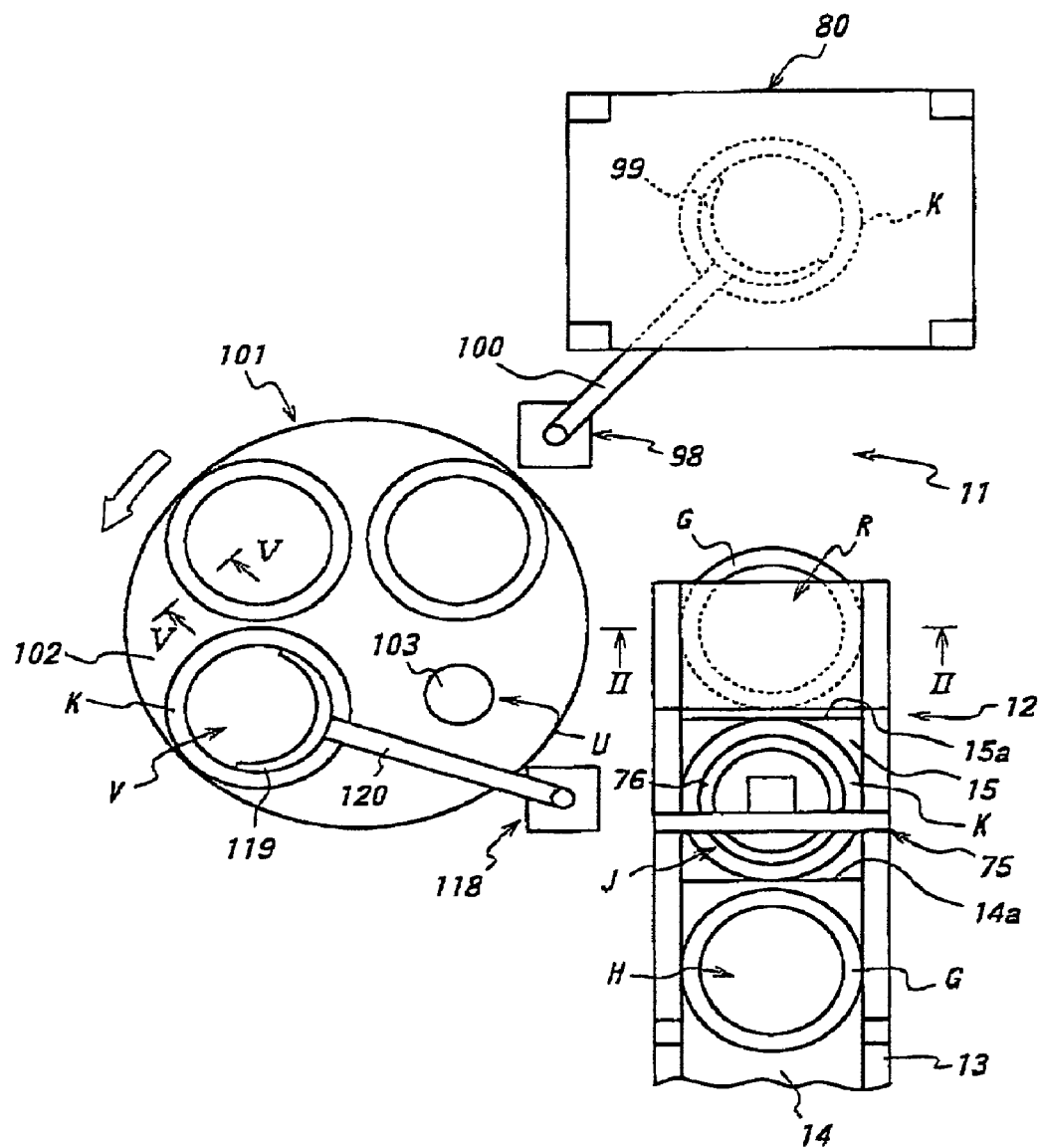
FIG. 1 is a schematic plan view showing one embodiment of the apparatus for performing the method according to the present invention.
Figure 2:
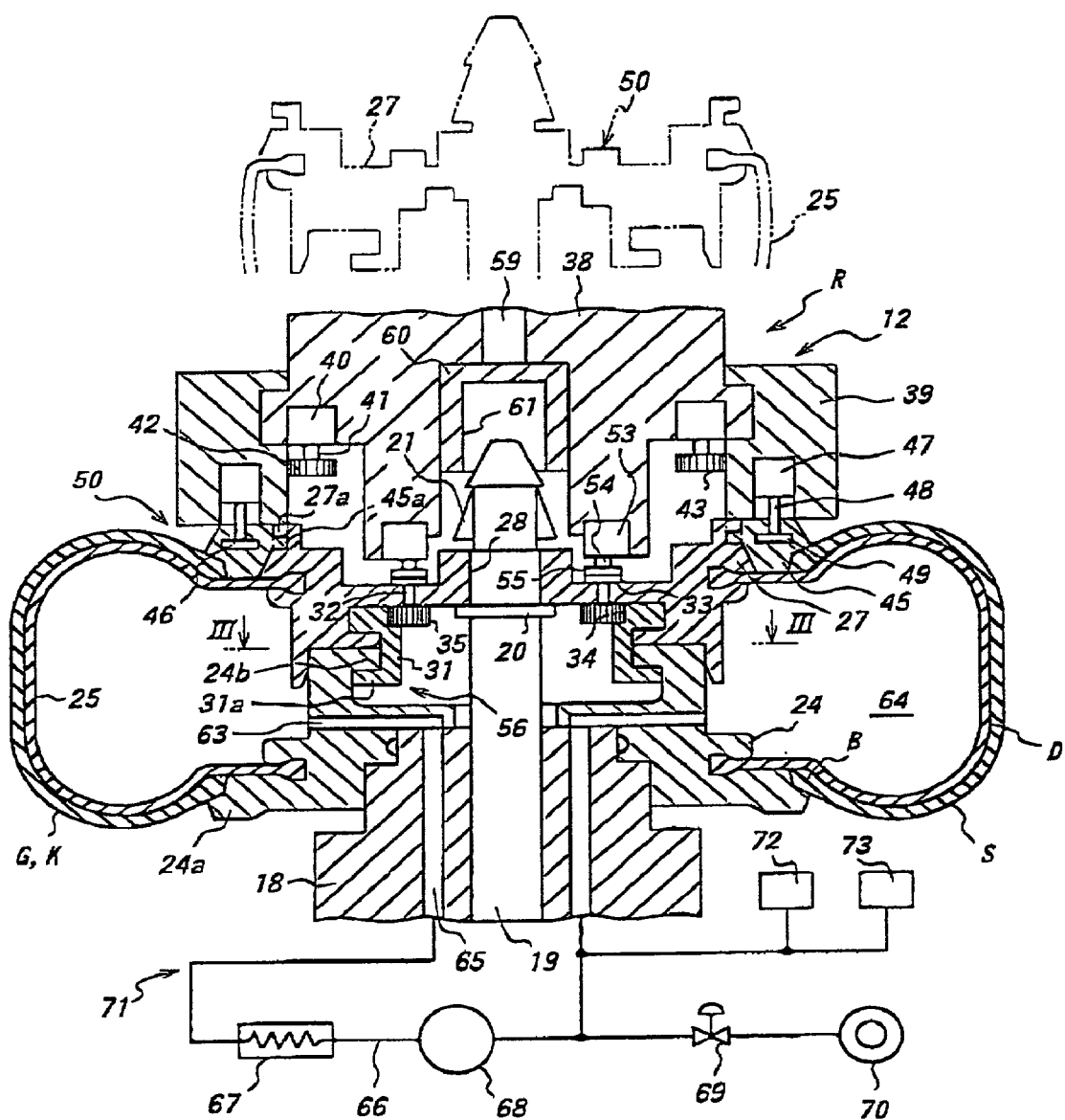
FIG. 2 is a sectional view taken along the line II—II in FIG. 1.
Figure 3:
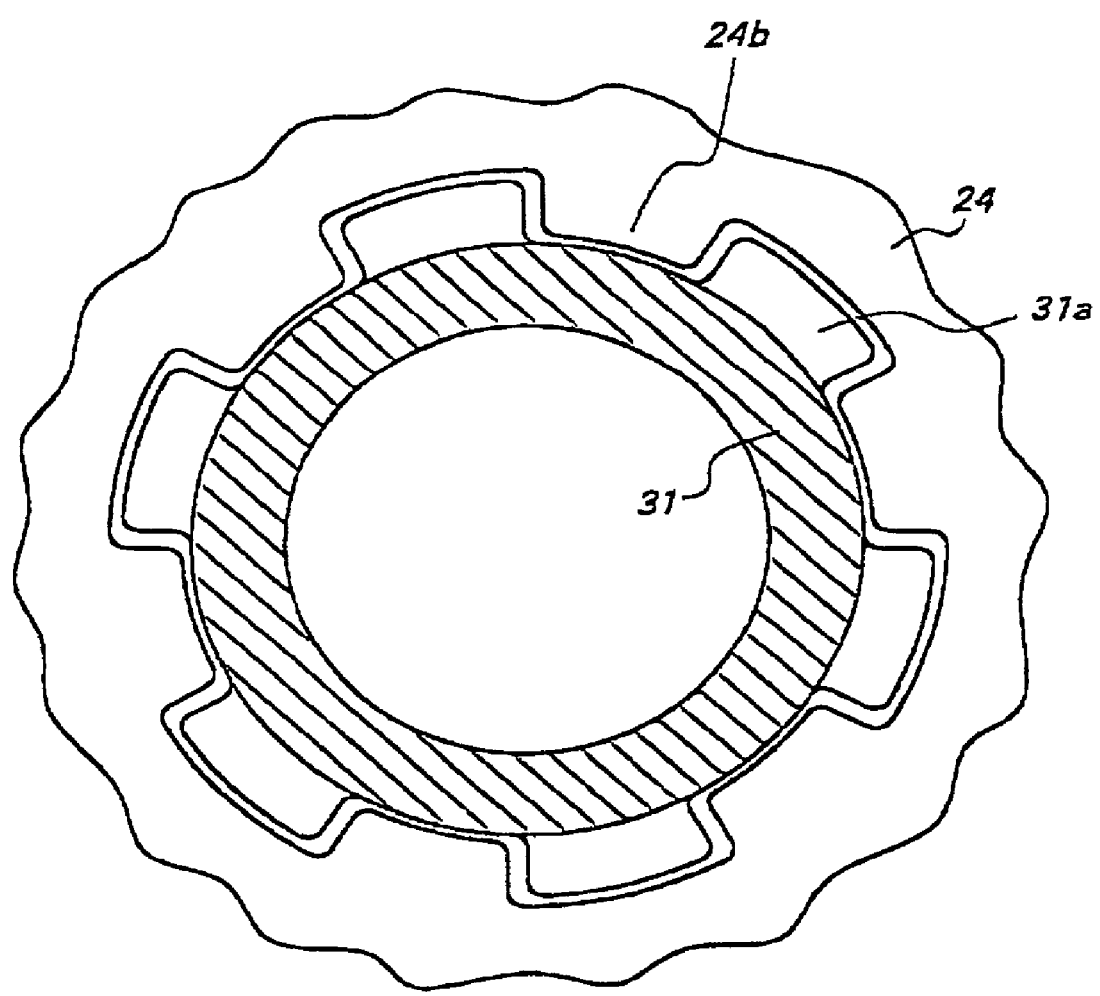
FIG. 3 is a sectional view taken along the line III—III in FIG. 2.

Referring now to FIGS. 1, 2 and 3, reference numeral 11 designates an apparatus suitable for performing the method according to the present invention, for highly efficiently producing pneumatic tires, which may be for passenger cars, for example. The apparatus 11 includes a preprocessing machine 12 that extends in the fore-and-aft direction. The preprocessing machine 12 has a stationary frame 13 supporting two sets of horizontal conveyers 14, 15 that are vertically spaced from each other. The conveyers 14, 15 extend in the longitudinal direction of the frame 13 and are operated in opposite directions.

The conveyer 14 on the upper side transfers a green tire G forwardly, i.e., toward the downstream end 14a of the conveyer 14. It is assumed that the green tire G has been formed by a building machine (not shown) and is laid horizontally on the conveyer 14. The conveyer 15 on the lower side, in turn, has an upstream end 15a that extends beyond the downstream end 14a of the conveyer 14 substantially by a distance That corresponds to the diameter of the green tire G, and transfers a vulcanized tire K to a next processing station. It is also assumed that the vulcanized tire K is laid horizontally on the conveyer 15.

As shown in FIG. 2, a vertical supporting stand 18 is arranged at a processing station R opposite to the upstream end 15a of the conveyer 15. The supporting stand 18 is provided therein with a column-like center post 19 that is fixed to the frame 13. The center post 19 is raised and lowered by a cylinder (not shown), between a lower limit position where a flange 20 to be described hereinafter is in abutment with an upper surface of the supporting stand 18, and an upper limit position indicated by imaginary line in FIG. 2.

The center post 19 has an upper end whose outer periphery is provided with the aforementioned flange 20 having an annular shape. Above the flange 20, the center post 19 is further provided with a plurality of substantially triangular pawls 21 that are circumferentially and equidistantly spaced from one another and adapted to swing about the upper end of the center post 19 about their horizontal axes, respectively. The pawls 21 project from the outer peripheral surface of the center post 19 when they are swung radially outwardly by associated springs (not shown). The pawls 21 are retracted to become flush with the outer peripheral surface of the center post 19 when they are urged radially inwardly against the springs, respectively.

Reference numeral 24 designates a substantially cylindrical lower holder carried into and placed onto the supporting stand 18. The lower holder 24 is mounted with an axial end (i.e., lower end) of a bladder 25. The lower holder 24 has a supporting portion 24a just under the lower end of the bladder 25, so as to support the lower bead portion B of the green tire G. The supporting portion 24a has an outer diameter larger than that of the lower holder 24 at a mounting portion thereof for mounting the bladder 25. As shown in FIG. 3, the upper end portion of the lower holder 24 is formed with a plurality of protruding portions 24b protruding radially inwardly. The protruding portions 24b are spaced circumferentially and equidistantly from one another so as to exhibit arcuate shape, respectively.

Reference numeral 27 designates an upper holder body having a diameter smaller than the inner diameter of the bead portion B of the green tire G, and this upper holder body 27 is arranged above the lower holder 24 and mounted with the other axial end (i.e., upper end) of the bladder 25.

The upper holder body 27 is formed, on its center axis, with a through-hole 28 having the same diameter as the center post 19 so that the upper end portion of the center post 19 can be penetrated through the through-hole 28.

When the center post 19 is raised from the lower limit position, the pawls 21 are pushed into the center post 19 by virtue of the through-hole 28 such that the upper end portion of the center post 19 is projected upwardly from the upper surface of the upper holder body 27. The pawls 21 are subsequently passed beyond the through-hole 28 so that the pawls 21 are swung and projected from the outer peripheral surface of the center post 19 by the urging forces of the associated springs, respectively. By continuously raising the center post 19 thereafter, the flange 20 is caused to abut onto the lower surface of the upper holder body 27, so that the upper holder body 27 is lifted up to a position indicated by the imaginary line in FIG. 2 to thereby extend the bladder 25 into a substantially cylindrical shape.

Reference numeral 31 designates a joint ring rotatably coupled to the inner periphery of the upper holder body 27. The joint ring 31 has a lower end of a diameter slightly smaller than the inner diameter of the protruding portion 24b. As shown in FIG. 3, the joint ring 31 is formed, at the outer periphery of its lower end, with radially outwardly protruded portions 31a of the same number as the protruding portions 24b. The protruding portions 31a are spaced circumferentially and equidistantly from one another so as to exhibit arcuate shape, respectively.

Reference numerals 32 designate vertical rotary shafts that are rotatably supported by the upper holder body 27 near the inner periphery of the joint ring 31. Each rotary shaft 32 has an upper end provided with a clutch piece 33 for preventing the rotary shaft 32 from falling from the upper holder body 27. Further, each rotary shaft 32 has a lower end provided with a pinion 35 to be meshed with internal teeth 34 formed at the inner periphery of the joint ring 31. As a result, in a state where the protruding portions 31a of the joint ring 31 are positioned between the protruding portions 24b of the lower holder 24, respectively, when the joint ring 31 is rotated by the rotary shafts 32 such that the protruding portions 24b and protruding portions 31a are vertically overlapped with each other, the lower holder 24 and upper holder body 27 are joined to each other.

Reference numeral 38 designates a cylindrical elevating stand supported, in a manner to be raised and lowered, by the fixing frame 13 just above the supporting stand 18. The elevating stand 38 can be raised and lowered by a cylinder, not shown, toward and away from the supporting stand 18. The elevating stand 38 has an outer periphery of its lower end, coupled with a rotary ring 39 coaxial with the elevating stand 38.

Reference numerals 40 designate motors fixed to the elevating stand 38. Each motor 40 has an output shaft 41 provided with a pinion 42 that is meshed with internal teeth 43 formed at the inner periphery of the rotary ring 39. When the motors 40 operate to rotate the pinions 42, respectively, the rotary ring 39 is rotated about a vertical axis, while being supported by the elevating stand 38.

Reference numeral 45 designates an upper bead ring capable of supporting the upper bead portion B. The upper bead ring 45 has an upper surface formed with a plurality of joining holes 46 each having an elliptical opening portion and a circular interior end. Reference numerals 47 designate cylinders mounted at the lower portion of the rotary ring 39. Each cylinder 47 includes a piston rod 48 having a tip end fixed with a joining piece 49 having a substantially same shape as the opening portion of each joining hole 46. The upper bead ring 45 is joined to the rotary ring 39, when piston rods 48 are protruded from the associated cylinders 47, respectively, such that the joining pieces 49 are passed into the bottoms of the joining holes 46 via opening portions of joining holes 46, and then the cylinders 47 are rotated by angles of 90° by a rotating mechanism, not shown.

The upper holder body 27 includes an upper end portion having an outer periphery formed with a plurality of protruding portions 27a similarly to the protruding portions 24b of the lower holder 24. The upper bead ring 45 includes an upper portion having an inner periphery formed with protruding portions 45a, similarly to the protruding portions 31a of the joint ring 31 and at the same number as that of protruding portions 27a. As a result, in a state where the upper bead ring 45 is joined to the rotary ring 39 by the cylinders 47 and joining pieces 49, when the elevating stand 38 is lowered to the lower limit position so that the protruding portions 45a of the upper bead ring 45 have passed through between the protruding portions 27a of the upper holder body 27. The rotary ring 39 is then rotated by the motors 40 such that the protruding portions 27a and protruding portions 45a are vertically overlapped, when the upper bead ring 45 is integrally joined to the upper holder body 27.

Thereafter, when the cylinders 47 are rotated so that the piston rods 48 are retracted to thereby pull the joining pieces 49 out of the joining holes 46, respectively, the joint between the upper bead ring 45 and rotary ring 39 is released. In this way, when the upper bead ring 45 is joined only to the upper holder body 27, the upper holder body 27 and upper bead ring 45 cooperatively constitute an upper holder 50 that is paired with the lower holder 24.

Reference numerals 53 designate motors fixed to the lower end of the elevating stand 38. Each motor 53 includes an output shaft 54 having a tip end provided with a clutch piece 55 to be coupled to the associated clutch piece 33 when the elevating stand 38 is lowered to its lower limit position. When the clutch pieces 33, 55 are mutually coupled, the motors 53 are operated to rotate the pinions 35 and thereby rotate the joint ring 31 while being supported by the upper holder body 27.

The above-mentioned joint ring 31, rotary shafts 32, clutch pieces 33, pinions 35, motors 53 and clutch pieces 55 cooperatively constitute joining means 56 for mutually joining the paired lower and upper holders 24, 50 for supporting both bead portions B of the green tire G, respectively.

Reference numeral 59 designates an elevating rod supported, in a manner to be raised and lowered, by the elevating stand 38. The elevating rod 59 is coaxial with the center post 19 and can be raised and lowered by a cylinder, not shown. The elevating rod 59 has a lower end fixed with a push-in cap 60 formed with a recess 61, which is coaxial with, and of the same diameter as the through-hole 28.

When the elevating rod 59 and push-in cap 60 are lowered and fitted onto the center post 19 by the cylinder in a state where the elevating stand 38 is at its lower limit position, the pawls 21 are pushed radially inwards by the inner periphery of the recess 61. When the center post 19 is lowered in this state, the center post 19 is allowed to pass through the through-hole 28 to thereby downwardly escape therefrom, without being obstructed by the pawls 21.

Reference numerals 63 designate a pair of first fluid passages formed within the lower holder 24. Each first fluid passage 63 has one end opened at the outer periphery of the lower holder 24 so as to communicate with a bladder space 64 confined by the lower holder 24, bladder 25 and upper holder 50. Meanwhile, the first fluid passages 63 have the other ends opened at the lower surface of the lower holder 24, such that these openings are communicated with a pair of second fluid passages 65 formed within the supporting stand 18 when the lower and upper holders 24, 50 are supported on the supporting stand 18.

Reference numeral 66 designates a circulation passage having both ends connected to the respective ends of the second fluid passages 65. The circulation passage 66 is interposed therein with a heater 67 and a hydraulic pump 68. The circulation passage 66 is communicated, via a switching valve 69, with a fluid source 70 for supplying a fluid such as inert gas, steam or hot water heated to a high temperature. As a result, when the switching valve 69 is opened, the fluid from the fluid source 70 is supplied into the bladder space 64 via circulation passage 66, to thereby inflate the bladder 25 into a substantially toroidal shape within the green tire G.

When the green tire G and bladder 25 have been inflated to the predetermined toroidal shape, the switching valve 69 is switched to its closed state. Thereafter, the hydraulic pump 68 is operated so that the fluid within the bladder space 64 is brought to and heated by the heater 67 via the first fluid passage 63 and second fluid passage 65 and then returned to the bladder space 64 via the first fluid passage 63 and second fluid passage 65, such that the fluid is always kept at a predetermined and constant high temperature.

The first fluid passages 63, second fluid passages 65, heater 67, hydraulic pump 68 switching valve 69 and fluid source 70 cooperatively constitute inflating means 71 for supplying the fluid heated to the higher temperature into the bladder 25 (i.e., bladder space 64) having the opposite axial ends attached to the paired lower and upper holders 24, 50 to thereby inflate the bladder 25 within the green tire G. Reference numerals 72, 73 designate temperature sensor and pressure sensor for detecting the temperature and pressure of the fluid within the bladder 25, respectively.

Turning back to FIG. 1, reference numeral 75 designates transfer means capable of moving in the fore-and-aft direction while being guided by the frame 13 The transfer means 75 has a gripping mechanism 76 capable of being raised and lowered and of gripping the bead portions B of the tire from the radially inner side.

The transfer means 75 is capable of gripping, by the gripping mechanism 76, the green tire G transferred to the downstream end of the conveyer 14, i.e., up to a delivering station H, and then transferring the green tire G onto the lower holder 24, when the elevating stand 38 has been raised up to its upper limit position and the upper holder 50 has been raised up to its upper limit position indicated by the imaginary line in FIG. 2. The transfer means 75 is also capable of gripping the vulcanized tire K on the lower holder 24 by the gripping mechanism 76 and then transferring the vulcanized tire K to the upstream end of the conveyer 15, i.e., up to a takeout station J.

The above-mentioned stationary frame 13, conveyers 14, 15, supporting stand 18, elevating stand 38, rotary ring 39, motors 40, cylinders 47, joining means 56, push-in cap 60, inflating means 71 and transferring means 75 cooperatively constitute the preprocessing machine 12.

Figure 4:
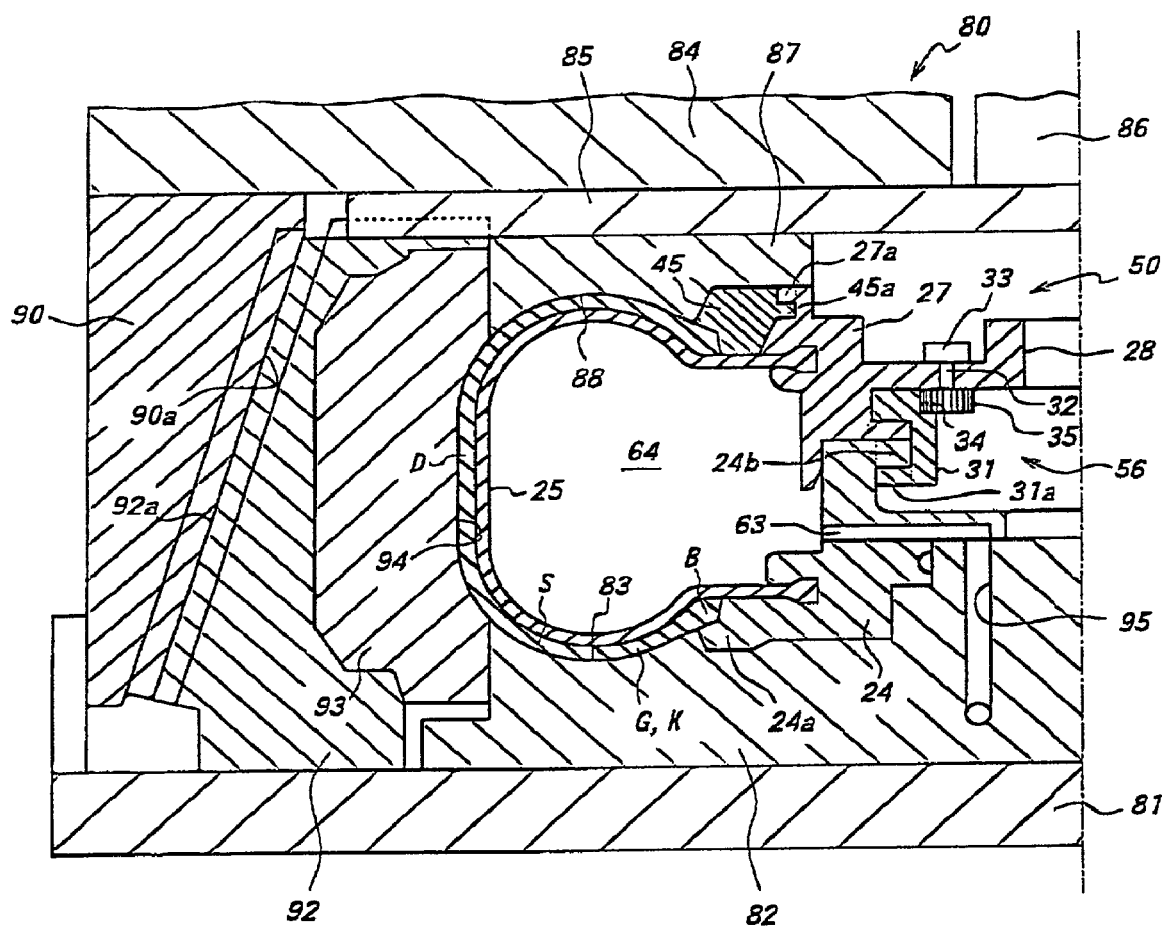
FIG. 4 is a half sectional view of the vulcanizer.

In FIGS. 1 and 4, reference numeral 80 designates a vulcanizer installed in front of the preprocessing machine 12. The vulcanizer 80 has a lower base 81 provided thereon with a lower mold 82. The lower mold 82 has its upper surface formed with a shaping surface 83 for shaping a sidewall portion S and the bead portion B of the green tire G.

Reference numeral 84 designates an upper base installed in a manner to be raised and lowered above the lower base 81. The upper base 84 can be brought away and toward the lower base 81 by raising and lowering the upper base 84. Reference numeral 85 designates an upper plate installed just under the upper base 84. The upper plate 85 is mounted to a lower end of a vertically extending piston rod 86 of a cylinder which, in turn, is mounted to the upper base 84.

As a result, the operation of the cylinder allows the upper plate 85 to be raised and lowered, independently of the upper base 84. The upper plate 85 has a lower surface fixed with an upper mold 87. The upper mold 87 has a lower surface formed with a shaping surface 88 for shaping the sidewall portion S and bead portion B of the green tire G.

Reference numeral 90 designates an outer ring installed so as to surround the upper plate 85 from the radially outer side thereof. The outer ring 90 has an upper end fixed to the radially outer end of the upper base 84. Also, the outer ring 90 has an inner periphery formed with a surface 90a inclined upwardly and radially inwardly.

Reference numerals 92 designate a plurality of, here nine pieces of, sector segments arranged in a manner to be juxtaposed in the circumferential direction. These sector segments 92 have upper ends supported by the lower surface of the upper plate 85 at positions radially outward of the upper mold 87, such that the sector segments 92 are moveable in the radial direction. Further, the sector segments 92 have their inner peripheries provided with sector molds 93 having radially inner surfaces formed with shaping surfaces 94 for primarily shaping a tread,portion D of the green tire G, respectively.

The sector segments 92 have their outer peripheries formed with inclined surfaces 92a having the same inclination as the inclined surfaces 90a of the outer ring 90. The inclined surfaces 92a and the inclined surface 90a are coupled to each other by dovetail joints, so as to be slidably engaged with one another. As a result, by raising and lowering the outer ring 90 relative to the upper plate 85, the sector segments 92 are moved radially and synchronously by the wedging effect of the inclined surfaces 90a, 92a, while allowing the sector segments 92 to be supported by the upper plate 85.

When the upper base 84 is lowered to its lower limit position, all of the sector molds 93 are urged by the outer ring 90 toward the radially inner limit where the neighboring sector molds 93 are closely contacted with one another to thereby exhibit a continuous ring shape. At this time, when the lower and upper holders 24, 50 in a joined state for supporting the green tire G are placed on the lower mold 82, the upper holder 50 is closely contacted with the upper mold 87 at its lower limit position and the upper, lower and sector molds 87, 82, 93 are closed to thereby internally define a vulcanizing space of toroidal shape for housing the green tire G therein.

Reference numerals 95 designate heat medium passages formed within the lower mold 82. The heat medium passages 95 are communicated to the first fluid passages 63 of the lower holder 24, when the lower and upper holders 24, 50 in a joined state are placed on the lower mold 82. When the heat medium at high temperature and high pressure is supplied into the green tire G, specifically into the bladder 25, from a heat medium source, not shown, the green tire G is vulcanized while being pressed onto the shaping surfaces 83, 88, 94.

The above-mentioned lower base 81, lower mold 82, upper base 84, upper plate 85, upper mold 87, outer ring 90, sector segments 92 and sector molds 93 cooperatively constitute the vulcanizer 80 for vulcanizing the green tire G into a vulcanized tire K by supplying the heat medium into the bladder 25. Since such a vulcanizer 80 does not require conventional center post, upper and lower clamp rings and bladder, the vulcanizer 80 itself has a simplified structure and can be fabricated inexpensively.

Reference numeral 98 designates a first transfer machine installed between the preprocessing machine 12 and vulcanizer 80. The first transfer machine 98 includes an arm 100 which is adapted to be swung and raised and lowered and which has a tip end provided with a gripping mechanism 99 for gripping the upper holder 50. The first transfer machine 98 grips, by its gripping mechanism 99, the lower and upper holders 24, 50 supporting the green tire G at the processing station R, and then raises the arm 100 and swings the same toward the vulcanizer 80 so as to transfer the lower and upper holders 24, 50 up to just above the lower mold 82.

Subsequently, the arm 100 is lowered to place the lower and upper holders 24, 50 onto the lower mold 82, and the lower and upper holders 24, 50 are then released from the grip by the gripping mechanism 99. In this way, the green tire G is transferred together with the lower and upper holders 24, 50, from the preprocessing machine 12 to the vulcanizer 80.

Figure 5:
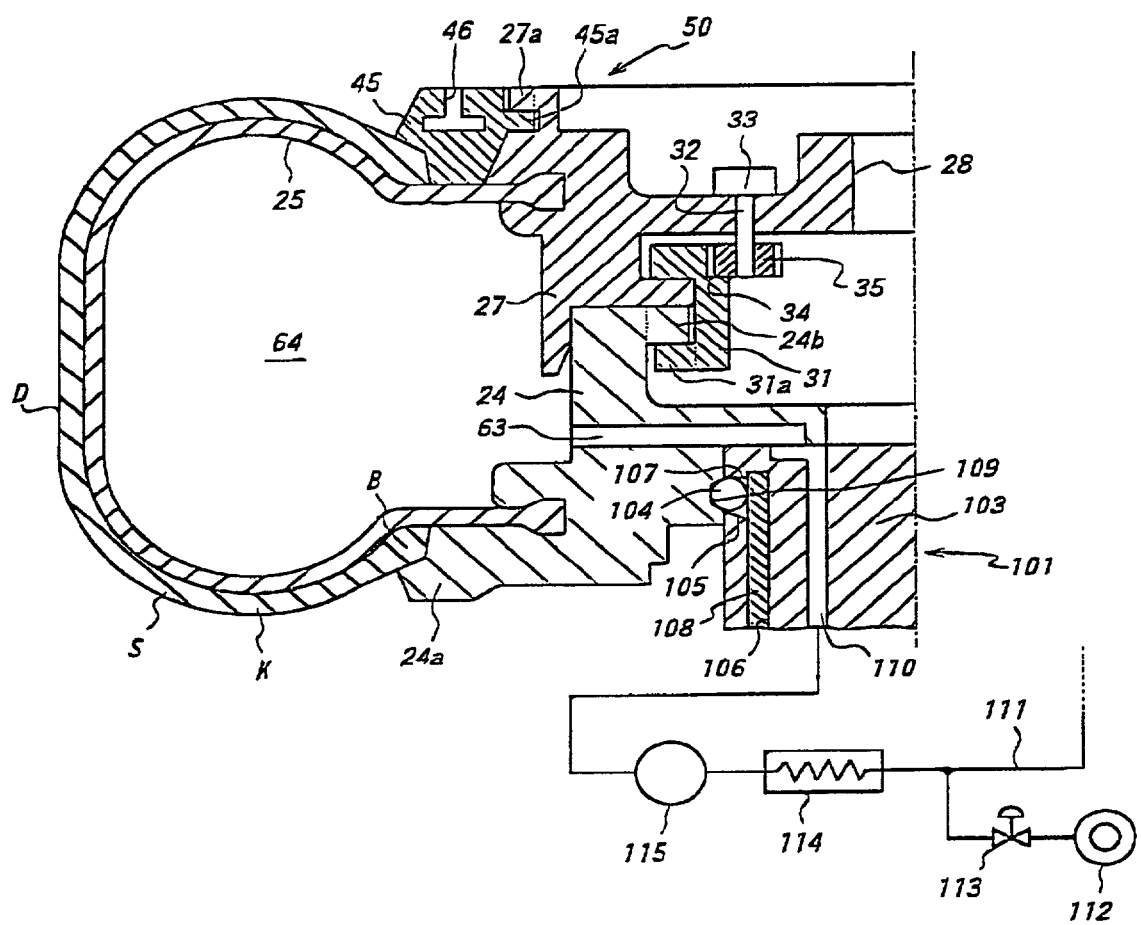
FIG. 5 is a sectional view taken along the line V—V in FIG. 1.

In FIGS. 1 and 5, reference numeral 101 designates a post-cure inflator installed on one side of the processing station R. The post-cure inflator 101 has a disc-like horizontal turntable 102 to be intermittently rotated about a vertical axis by a motor (not shown).

Rotatably supported on the turntable 102 are a plurality of, here 4 pieces of, rotary shafts 103 circumferentially and equiangularly spaced from one another. The rotary shafts 103 are rotated about vertical axes at lower speeds by motors (not shown), respectively. Further, that rotary shaft 103, which is positioned at a receiving station U of the post-cure inflator 101, receives the vulcanized tire K together with the lower and upper holders 24, 50 from the vulcanizer 80 by means of the first transfer machine 98.

Each rotary shaft 103 includes an upper end portion having an outer periphery formed with a plurality of circumferentially spaced ball apertures 104. These ball apertures 104 house therein coupling balls 105, respectively, in a manner to be radially moveable. Reference numeral 106 designates a cylindrical-wall like slot formed within the rotary shaft 103 coaxially with the rotary shaft 103. The slot 106 is inserted therein with a cylinder body 108 including its upper end having an outer periphery formed with an inclined surface 107.

When the cylinder body 108 is raised to thereby protrude the parts of coupling balls 105 from the outer periphery of the rotary shaft 103 in a state where the lower holder 24 is placed on the rotary shaft 103, the protruded portions of the coupling balls 105 are inserted into a circumference groove 109 formed at the inner periphery of the lower holder 24 so that the lower and upper holders 24, 50 are attached onto the rotary shaft 103. Contrary, when the cylinder body 108 is lowered, the coupling balls 105 are engaged with the inclined surface 107 and moved radially inwardly, so that the entire coupling balls 105 are fully retracted from the outer periphery of the rotary shaft 103 into the rotary shaft 103. This allows the lower and upper holders 24, 50 to be detached from the rotary shaft 103.

When the lower holder 24 is attached to the rotary shaft 103 in the manner described above, the first fluid passages 63 are communicated to fluid passages 110 formed in the rotary shaft 103. Thereafter, there is supplied into the bladder 25 a low-temperature fluid such as cool water or cool air from a fluid source 112 via circulation passages 111 communicated to the fluid passages 110, while rotating the shaft 103 at a lower speed, to thereby accelerate cooling of the vulcanized tire K. Once the interior of the bladder 25 has been filled with the cool fluid, a switching valve 113 is closed and the fluid within the bladder 25 is then circulated by a pump 115 while cooling the fluid by a heat exchanger 114, so that the vulcanized tire K is continuously quenched.

Reference numeral 118 designates a second transfer machine installed between the preprocessing machine 12 and the post-cure inflator 101. The second transfer machine 118 includes a gripping mechanism 119 and an arm 120, similar to the gripping mechanism 99 and arm 100 of the first transfer machine 98. After the cooling of the vulcanized tire K, the second transfer machine 118 grips the vulcanized tire K together with the lower and upper holders 24, 50 positioned at an unloading station V, transfers them to the processing station R, and places the lower holder 24 onto the supporting stand 18.

In operation, it is assumed that the conveyer 14 is operated so that a green tire G is carried into the delivering station H. At this time, the elevating stand 38 is kept stand-by at its upper limit position, and the center post 19 is raised to its upper limit position at the processing station R so as to raise the upper holder body 27 up to its upper limit position indicated by the imaginary line in FIG. 2. Thus, the bladder 25 is upwardly inflated into a cylindrical shape. Simultaneously, the vulcanizer 80 is performing vulcanization of a green tire C, while at the post-cure inflator 101 those rotary shafts 103 carrying vulcanized tires K are slowly rotated to thereby cool the vulcanized tires K though the rotation of the turntable 102 has been stopped.

The transferring means 75 is then operated so that the gripping mechanism 76 grips and raises the green tire G at the delivering station H, and transfers the green tire G up to the processing station R, i.e., up to between the elevating stand 38 and supporting stand 18. The gripping mechanism 76 is then lowered together with the green tire G, so as to place the lower bead portion B of the green tire G onto the supporting portion 24a of the lower holder 24, thereby supporting the supporting portion 24a from the lower side. At this time, since the bladder 25 is extended upwardly to exhibit the cylindrical shape as described above, the green tire G is transferred down to the lower holder 24 without being obstructed by the bladder 25. The transferring means 75 is then returned to its initial position, after released from the grip.

The center post 19 is now to be lowered. At this time, the pawls 21 have been swung by the urging force of springs so as to protrude from the outer peripheral surface of the center post 19 By this, the pawls 21 are hooked onto the upper surface of the upper holder body 27 such that the upper holder body 27 is lowered integrally with the pawls 21. Simultaneously, the switching valve 69 is opened and the fluid heated to high temperature is supplied from the fluid source 70 into the bladder 25 to thereby gradually inflate the bladder 25 within the green tire G. Simultaneously with the lowering of the center post 19, the elevating stand 38 is also lowered.

Once the lower surface of the upper holder body 27 has abutted onto the upper surface of the lower holder 24, the lowering of the center post 19 is to be stopped. At this time, the bladder 25 is inflated within the green tire G so as to have a substantially toroidal cross section. Thereafter, the elevating stand 38 is lowered until the upper bead ring 45 abuts onto the upper holder body 27, and this lowering is then stopped. At this time, the upper bead ring 45 supports the upper bead portion B of the green tire G from the above. Further, the protruding portions 45a of the upper bead ring 45 pass between the protruding portions 27a of the upper holder body 27, and the clutch pieces 55 are coupled to the clutch pieces 33 so that the motors 53 are coupled to the pinions 35, respectively.

The motors 40, 53 are now driven to thereby rotate the pinions 42, 35 engaged with the internal teeth 43, 34, respectively, so as to rotate the rotary ring 39 and joint ring 31 supported by the elevating stand 38 and upper holder body 27, respectively, about vertical axes. Once the protruding portions 27a and protruding portions 45a as well as the protruding portions 24b and protruding portions 31a are mutually vertically overlapped, respectively, the motors 40, 53 are stopped. This couples the upper bead ring 45 to the upper holder body 27 to thereby establish the upper holder 50, and also couples the lower holder 24 and upper holder 50 to each other.

In the above, once the green tire G and bladder 25 are inflated into the substantially toroidal shape, the switching valve 69 is switched into the closed state. Thereafter, the hydraulic pump 68 is operated so that the fluid within the bladder space 64 is conducted to the heater 67 and heated thereby, and then again returned into the bladder space 64, so that the fluid is always kept at a predetermined higher constant temperature. In this way, the lower and upper holders 24, 50, bladder 25 and green tire G are heated in advance of the actual vulcanizing operation and they are kept stand-by in this state until starting the vulcanization. It is thus possible to eliminate the waiting time for heating them from ordinary temperatures up to the predetermined high temperature, and to thereby shorten the vulcanization time for green tires G.

Next, the cylinder is operated to lower the elevating rod 59 and push-in cap 60 until abutting onto the upper holder body 27, to thereby fit the push-in cap 60 onto the upper end portion of the center post 19. This pushes the pawls 21 radially inwardly by the inner periphery of the recess 61. In this state, the center post 19 is lowered to its lowered-limit position. At this time, the pawls 21 have been retracted into the center post 19, so that the center post 19 is allowed to pass through the through-hole 28 to thereby downwardly escape therefrom, without being obstructed by the pawls 21.

The cylinders 47 are then rotated so that the piston rods 48 of cylinders 47 are retracted to thereby pull the joining pieces 49 out of the joining holes 46, respectively. Thus, the joint between the upper bead ring 45 and rotary ring 39 is released. Thereafter, the elevating stand 38 is raised to its upper limit position.

In this way, the green tire G, lower and upper holders 24, 50 as well as bladder 25 are combined with one another and the fluid is supplied into the bladder 25 to thereby inflate it, at a location outside of the vulcanizer 80, here at the processing station R, before the vulcanizing operation. Thus, the combined components can be delivered into the vulcanizer 80 as they are, making it possible to immediately start the vulcanizing operation, and thereby improve the overall work efficiency.

Once the green tire G has been vulcanized and formed into the vulcanized tire K at the vulcanizer 80, the upper base 84 and outer ring 90 are raised. However, the upper plate 85 is kept stationary at this time, so that the sector segments 92 and sector molds 93 are synchronously moved and radially outwards by the wedging effect of the inclined surfaces 90a, 92a, while allowing the sector segments 92, hence the sector molds 93, to be supported by the upper plate 85. Thereafter, the upper plate 85, upper mold 87, sector segments 92 and sector molds 93 are raised at the same speed as the upper base 84, to thereby open the vulcanizer 80.

Next, the lower and upper holders 24, 50 supporting the vulcanized tire K are gripped by the gripping mechanism 99, and the arm 100 is then raised. Thereafter, the arm 100 is swung toward the post-cure inflator 101 so as to transfer the gripped components toward just above an empty rotary shaft 103 at the receiving station U. The arm 100 is then lowered so as to place the lower and upper holders 24, 50 onto the rotary shaft 103, and releases the lower and upper holders 24, 50 from the grip by the gripping mechanism 99. In this way, the vulcanized tire K is transferred from the vulcanizer 80 to the post-cure inflator 101 together with the lower and upper holders 24, 50 by the first transfer machine 98.

At this time, the cylinder body 108 is raised so that the portions of the coupling balls 105 are protruded from the outer periphery of the rotary shaft 103 and inserted into the circumference groove 109. Thus, the lower and upper holders 24, 50 supporting the vulcanized tire K are attached to the rotary shaft 103. Thereafter, the low-temperature fluid is supplied into the bladder 25 while rotating the rotary shaft 103 at a low speed, thereby cooling the vulcanized tire K. Once the interior of the bladder 25 has been filled with the low-temperature fluid, the switching valve 113 is closed and the fluid within the bladder 25 is circulated by the pump 115 while cooling the fluid by the heat exchanger 114, thereby continuously cooling the vulcanized tire K.

In this way, the vulcanized tire K is transferred from the vulcanizer 80 to the post-cure inflator 101 together with the lower and upper holders 24, 50 as well as the bladder 25, and the vulcanized tire K is cooled by rotating the rotary shaft 103 of the post-cure inflator 101 after the lower and upper holders 24, 50 have been attached to the rotary shaft 103. This eliminates the necessity of time for discharging the heat medium from the bladder 25 after vulcanization, to thereby improve the overall work efficiency.

Further, it becomes also unnecessary to separate the vulcanized tire K from the bladder 25, and to mount the vulcanized tire K onto a rim of a post-cure inflator which has been conventionally provided. This allows to improve the uniformity of product tires. Further, the conventionally provided rim is substituted by the lower and upper holders 24, 50, thereby allowing simplification in terms of structure of the post-cure inflator 101.

Since the low-temperature fluid is supplied into the bladder 25 upon cooling the vulcanized tire K as described above, the vulcanized tire K can be rapidly cooled while avoiding a direct contact between the inner surface of the vulcanized tire K and the fluid.

Meanwhile, when the gripping mechanism 99 has released the lower and upper holders 24, 50 from the grip by this mechanism, the arm 100 is swung toward the vulcanizer 80. When the gripping mechanism 99 has reached just above the processing station R midway through the swing, the swinging of the arm 100 is stopped temporarily. Next, the arm 100 is lowered and then the gripping mechanism 99 grips the lower and upper holders 24, 50 supporting the green tire G kept stand-by in a pre-heated manner at the processing station R.

Next, the arm 100 is raised and then swung up toward the vulcanizer 80. Further, the arm 100 is lowered until the green tire G is placed onto the lower mold 82, whereupon the gripping mechanism 99 releases the lower and upper holders 24, 50 from the grip by this mechanism. Thereafter, the arm 100 is raised and swung up to a stand-by position between the vulcanizer 80 and preprocessing machine 12.

Subsequently, the upper base 84 and upper plate 85 are synchronously lowered such that the lowering of the upper plate 85 is stopped when the sector segments 92 have abutted onto the upper surface, and then only the upper base 84 and outer ring 90 are kept lowered. As a result, the sector segments 92 and sector molds 93 are pushed by the outer ring 90 and thus moved radially inwards, while being supported by the upper plate 85. Then, when the upper base 84 has lowered down to its lower limit position, the neighboring sector molds 93 are closely contacted with one another, to thereby exhibit a continuous annular shape. At this time, the upper and lower holders 50, 24 in the joined state are closely contacted with the upper and lower molds 87, 82 and clamped from the above and below so that the green tire G is housed within the vulcanizing space.

The heat medium at high temperature and high pressure is then supplied into the green tire G, specifically into the bladder 25, from the heat medium source via medium passages 95 and first fluid passages 63. Thus, the green tire G is vulcanized while being pressed onto the shaping surfaces 83, 88, 94. At this time, the lower and upper holders 24, 50 are joined to each other, so that the fluid force of the heat medium acting onto the lower and upper holders 24, 50 is born by the joint ring 31, thereby allowing to reduce the tightening force by the vulcanizer 80 upon vulcanization.

Meanwhile, when the first transfer machine 98 has started transfer of the lower and upper holders 24, 50 as well as the green tire G from the processing station R toward the vulcanizer 80, the arm 120 of the second transfer machine 118 is swung up to the unloading station V and then lowered so that the gripping mechanism 119 grips the lower and upper holders 24, 50 supporting the vulcanized tire K which has been cooled. At this time, the cylinder body 108 of the rotary shaft 103 positioned at the unloading station V is lowered, so that the coupling balls 105 are withdrawn from the circumference groove 109, to thereby release the coupling between the lower and upper holders 24, 50, on one hand, and the rotary shaft 103, on the other hand.

Subsequently, the arm 120 is raised while gripping the lower and upper holders 24, 50 and vulcanized tire K, and then swung toward the processing station R so as to transfer the gripped lower and upper holders 24, 50 and vulcanized tire K toward the processing station R. The arm 120 is then lowered until the lower and upper holders 24, 50 are placed onto the supporting stand 18, whereupon the gripping mechanism 119 releases the lower and upper holders 24, 50 from the grip thereof. The arm 120 is then raised and swung toward the stand-by position between the preprocessing machine 12 and post-cure inflator 101.

When the lower and upper holders 24, 50 and vulcanized tire K are detached from the rotary shaft 103 at the unloading station V in the above manner, the turntable 102 of the post-cure inflator 101 is rotated by 90°, so that the emptied rotary shaft 103 is moved up to the receiving station U.

At this time, the temperatures of the lower and upper holders 24, 50 on the supporting stand 18 have been lowered down to the substantially ordinary temperatures. It is thus desirable to previously heat the lower and upper holders 24, 50 such as by an electromagnetic induction heater (not shown), in preparation for the next vulcanization. Next, the elevating stand 38 is lowered down to its lower limit position, so that the rotary ring 39 is abutted onto the upper bead ring 45 and the clutch pieces 33, 55 are coupled to each other. The piston rods 48 of cylinders 47 are then protruded such that the joining pieces 49 are inserted into the bottoms of the joining holes 46, respectively, and the cylinders 47 and joining pieces 49 are rotated such that the rotary ring 39 and upper bead ring 45 are coupled to each other.

Next, the motors 40, 53 are operated to thereby rotate the rotary ring 39 and joint ring 31 until the protruding portions 45a are brought to be positioned between the protruding portions 27a and the protruding portions 31a are brought to be positioned between the protruding portions 24b, respectively, to thereby release the coupling between the upper bead ring 45 and upper holder body 27, and the coupling between the lower holder 24 and upper holder 50. Thereafter, the elevating stand 38 is raised up to its raised-limit position together with the upper bead ring 45.

The center post 19 is then raised so that the pawls 21 of the center post 19 are pushed into the center post 19 by the through-hole 28, to thereby allow the center post 19 to pass through the through-hole 28 and to protrude beyond the upper holder body 27. Thereafter, the pawls 21 are swung by the urging forces of the associated springs, respectively, to thereby protrude from the outer peripheral surface of the center post 19. By continuously raising the center post 19, the flange 20 is caused to abut onto the upper holder body 27, so that the upper holder body 27 is lifted up to the position indicated by imaginary line in FIG. 2 to thereby extend the bladder 25 into the substantially cylindrical shape.

The transfer means 75 is operated such that the vulcanized tire K at the processing station R is gripped by the gripping mechanism 76, and then raised and transferred up to just above the takeout station J. At this time, the bladder 25 has been upwardly extended to exhibit the cylindrical shape as described above, so that the vulcanized tire K can be lifted without being obstructed by the bladder 25.

Next, the gripping mechanism 76 is lowered together with the vulcanized tire K, to thereby transfer the vulcanized tire K onto the upstream end portion of the conveyer 15. The conveyer 15 is then operated to transfer the vulcanized tire K to a next station. The transfer means 75 is thereafter returned to its initial position.

What has been described above corresponds to one cycle of operation according to the present invention, and this cycle is repeated so as to successively produce pneumatic tires, one after another.

In the above-mentioned embodiment, the fluid has been supplied into the bladder 25 just before the lower and upper holders 24, 50 are joined to each other. However, it is possible according to the present invention to supply the fluid into the bladder 25 after the lower and upper holders 24, 50 have been joined to each other.

According to the present invention as described above, it becomes possible to inflate the bladder by an outside preparation, to thereby improve the overall work efficiency and productivity at a tire factory.

While the present invention has been described above with reference to a preferred embodiment shown in the drawings, it is needless to say that various changes and/or modifications may be made without departing from the scope of the invention as defined by the appended claims.

What is claimed is:

1. A method for producing a pneumatic tire, comprising:
   supporting both bead portions of a green tire by a pair of holders to which opposite axial ends of a bladder are tightly attached separately from a vulcanizer;
   joining the pair of holders to each other and supplying a liquid into the bladder to preliminarily inflate the bladder and green tire into a toroidal shape;
   transferring the preliminarily inflated bladder and green tire into the vulcanizer, together with the holders, after the preliminary inflation;
   supplying a heat medium into the bladder after transfer to the vulcanizer to thereby vulcanize the green tire and form a vulcanized tire;
   transferring the vulcanized tire, together with the holders and the bladder, from the vulcanizer to a post-cure inflator;
   attaching the holders to a rotary shaft of the post-cure inflator;
   rotating the rotary shaft of the post-cure inflator to thereby cool the vulcanized tire; and
   accelerating cooling of the vulcanized tire, by supplying a low-temperature liquid into the bladder.

2. The method according to claim 1, wherein the liquid supplied into the bladder for preliminary inflation is a high-temperature liquid for preheating the bladder and green tire prior to transfer into the vulcanizer.

3. An apparatus for producing a pneumatic tire, comprising:
   a preprocessing machine comprised of (i) joining means for mutually joining a pair of holders supporting both bead portions of a green tire, respectively, and (ii) preliminary inflating means for supplying a liquid into a bladder having opposite axial ends tightly attached to the holders, respectively, to preliminarily inflate the bladder and green tire into a toroidal shape;
   a vulcanizer for supplying a heat medium into the bladder and green tire, to thereby vulcanize the green tire and form a vulcanized tire;
   a transfer device that transfers the preliminarily inflated bladder and green tire, together with the holders, from the preprocessing machine to the vulcanizer, and that transfers the vulcanized tire, together with the holders and the bladder, from the vulcanizer to a post-cure inflator;
   means for circulating liquid through the bladder; and
   means for heating and/or cooling the liquid as the liquid is circulated through the bladder.

4. The apparatus of claim 3, wherein the means for heating and/or cooling the liquid is a heater.

5. The apparatus of claim 3, wherein the means for heating and/or cooling the liquid is a heat exchanger.

6. An apparatus for producing a pneumatic tire, comprising:
   a preprocessing machine comprised of (i) joining means for mutually joining a pair of holders supporting both bead portions of a green tire, respectively, and (ii) preliminary inflating means for supplying a liquid into a bladder having opposite axial ends tightly attached to the holders, respectively, to preliminarily inflate the bladder and green tire into a toroidal shape;
   a vulcanizer that supplies a heat medium into the bladder and green tire, to thereby vulcanize the green tire and form a vulcanized tire;
   a first transfer device that transfers the preliminarily inflated bladder and green tire, together with the holders, from the preprocessing machine to the vulcanizer; and that transfers the vulcanized tire, together with the holders and the bladder, from the vulcanizer to a post-cure inflator, and is usable to attach the holders to a rotary shaft of the post-cure inflator;
   a rotator that rotates the rotary shaft of the post-cure inflator to thereby cool the vulcanized tire;

a cooling acceleration system that accelerates cooling of the vulcanized tire by supplying a low-temperature liquid to the bladder; and a second transfer device that transfers the cooled vulcanized tire, together with the holders and the bladder, from the post-cure inflator to the preprocessing machine.

* * * * *